(12) United States Patent
Barberis et al.

(10) Patent No.: US 6,250,723 B1
(45) Date of Patent: Jun. 26, 2001

(54) BRAKING SYSTEM FOR A RAILWAY OR TRAM VEHICLE

(75) Inventors: Dario Barberis, Turin; Roberto Tione, Lauriano, both of (IT)

(73) Assignee: SAB WABCO S.p.A., Turin (IT)

( * ) Notice: Subject to any disclaimer, the term of this patent is extended or adjusted under 35 U.S.C. 154(b) by 0 days.

(21) Appl. No.: 09/289,635

(22) Filed: Apr. 12, 1999

(30) Foreign Application Priority Data

May 19, 1998 (IT) ................................................ T098A0421

(51) Int. Cl.[7] ................................................ B60T 13/00
(52) U.S. Cl. .................................. 303/7; 303/15; 303/20
(58) Field of Search .................................. 303/3, 7, 8, 15, 303/20, 22.6, 22.7, 29, 30, 63, 122.04, 122.05, 122.15

(56) References Cited

U.S. PATENT DOCUMENTS

| | | | |
|---|---|---|---|
| 4,564,245 | * | 1/1986 | Barberis .................................. 303/15 |
| 4,598,953 | * | 7/1986 | Wood et al. .............................. 303/3 |
| 5,669,674 | * | 9/1997 | McKay et al. ....................... 303/22.4 |
| 5,735,579 | * | 4/1998 | Wood et al. .............................. 303/7 |
| 5,791,744 | * | 8/1998 | Wood et al. .............................. 303/7 |
| 5,887,953 | * | 3/1999 | Wood et al. .............................. 303/7 |
| 5,984,426 | * | 11/1999 | Hart ....................................... 303/15 |

* cited by examiner

Primary Examiner—Robert J Oberleitner
Assistant Examiner—Bradley King
(74) Attorney, Agent, or Firm—Sughrue, Mion, Zinn, Macpeak & Seas, PLLC

(57) ABSTRACT

The system comprises at least one main pneumatic duct, actuators for the service brake and the supplementary brake, at least one auxiliary reservoir connected to the main duct and at least one compact electropheumatic control assembly. This assembly has an inlet connector connected to the main duct, an inlet/outlet connector connected to the reservoir and further connected, within the assembly, the inlet connector to allow supply to the reservoir of air under pressure from the main duct, and a plurality of further inlet/outlet connectors connected to the service and supplementary brake actuators. At least at one pneumatic control circuit for controlling the service and supplementary brake is connected between the reservoir and the further inlet/outlet connectors and comprise a plurality of solenoid control valves and pressure sensors/transducers. An electronic communications and control unit is connected to a communications bus, to the sensors, transducers and to the solenoid control valves, and control these latter to perform service braking or supplementary braking.

30 Claims, 14 Drawing Sheets

BRAKING SYSTEM FOR A RAILWAY OR TRAM VEHICLE

BACKGROUND OF THE INVENTION

The present invention relates to braking systems for railway or tram vehicles.

More specifically the invention relates to a braking system for a railway or tram vehicle having at least two axles, comprising at least one main pneumatic duct pneumatic actuator devices for the service brakes and the supplementary brakes, and at least one auxiliary reservoir connected to the said main duct and operable to provide the said actuators with compressed air for braking.

SUMMARY OF THE INVENTION

One object of the invention is to provide a braking system which has considerable structural simplicity, a wide versatility of performance and which involves a drastic simplification of the connections and operations necessary for its installation.

BRIEF DESCRIPTION OF THE DRAWINGS

Further characteristics and advantages of the system according to the invention will become apparent from the following detailed description given purely by way of non-limitative example with reference to the attached drawings, in which.

DETAILED SUMMARY OF THE INVENTION

Figure 1:
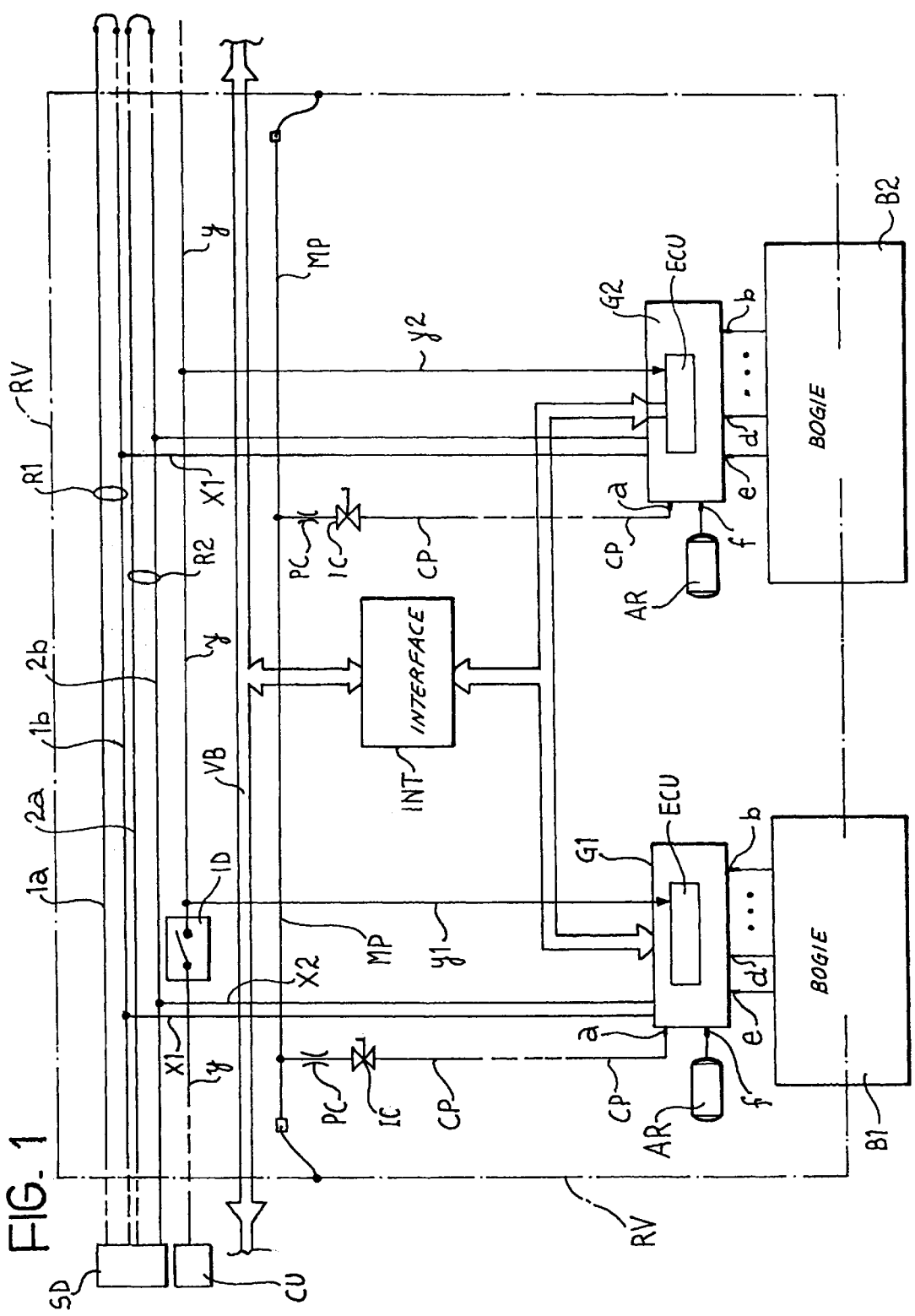
FIG. 1 is a block schematic diagram of a braking system for a railway or tram vehicle according to the invention.

In FIG. 1 RV generally indicates a railway or tram vehicle such as a carriage of a train or a locomotive. This vehicle RV is provided with at least two bogies B1 and B2 typically having at least two axles (in a manner known per se).

The vehicle RV has a braking system including at least one main pneumatic braking duct MP which extends along the vehicle and which is connected at its ends to corresponding ducts of similar vehicles connected to the one under consideration.

In the embodiment of FIG. 1 the vehicle RV is traversed by a communications bus VB which extends throughout the entire train of which the vehicle RV forms part, forming a local communications network between electronic apparatus for acquisition of information and control situated for example on the engine.

The braking system of the vehicle RV comprises two electropneumatic control assemblies generally indicated G1 and G2, each of which is associated with a respective bogie B1 and B1. The internal architecture of each of the electropneumatic control assemblies G1 and G2 will be further described hereinafter.

Each of the assemblies G1 and G2 comprises an electronic communications and control unit ECU formed for example by a microprocessor and other electronic components.

In the embodiment according to FIG. 1 the electronic unit ECU of each electropneumatic assembly G1 and G2 is connected to the communications bus VB by means of an interface device INT of bi-directional type. This interface device, which may, for example, be of a type known as a "gateway", can be prearranged to interpret control signals introduced onto the communications bus VB and to translate them into the communications protocol of the units ECU of the individual electropneumatic assemblies.

Each assembly G1 and G2 has an input connection a connected to the main braking duct MP by means of a single connection duct CP in which a throttle or choke PC for protection and an isolating tap IC are fitted.

Each electropneumatic assembly G1 and G2 has a plurality of outlet or inlet/outlet connectors indicated b–e, connected to brake actuator devices with which the associated bogies B1 and B2 respectively are provided.

Each assembly G1 and G2 has at least one further inlet/outlet connector f to which is connection an external auxiliary reservoir indicated AR. As will be better described hereinafter, within each electropneumatic assembly G1 or G2 the air under pressure which comes from the main duct MP through the connection ducts CP is forwarded to the said auxiliary reservoir AR and to possible further reservoirs connected to the assembly.

Within each assembly there are a plurality of pneumatic circuits for controlling the activation of the brake actuators connected to the connectors b–e of the assembly.

As will be described hereinafter, each of these pneumatic circuits includes a plurality of controlling solenoid valves controlled by the electronic unit ECU as well as sensors/transducers intended to provided electrical signals indicative of quantities or conditions monitored in these pneumatic circuits.

With reference to FIG. 1, along the vehicle RV extend first and second feed conductors 1a and 2a to which are respectively connected first and second return conductors 1b and 2b. These conductors extend through the entire train and each delivery conductor is connected to the corresponding return conductor at one end of the train of which the vehicle RV forms part, in such a way as to form first and second safety loops R1 and R2. At the other end of the train the conductors 1a, 1b and 2a, 2b are connected to a supply device indicated SD in FIG. 1, which is arranged to maintain them at respective different potentials.

At least one pair of wires x1 and x2 connected to the return conductors 2a and 2b of the safety loops R1 and R2 lead to each electropneumatic assembly G1 and G2 for control of the supplementary brake in a manner which will be better explained hereinafter.

Along the vehicle RV may be another line y connected to control apparatus CU preferably installed in the cabin. On the line y is interposed at least one intermediate device ID which can be actuated for example by means of an enabling key. The line y is connected to the control unit ECU of each assembly G1 and G2 by means of branch lines $y^1$ and $y^2$. In the case of breakdown for example of the bus VB the enablement of the device 1D makes it possible to send "breakdown" signals (for example of the on/off or PWM type) from the apparatus CU to the unit ECU of each assembly G1 and G2 ensuring an acceptable brake application and release function and the continuance of the service.

As will already be established from a study of FIG. 1, the braking system described above has an extremely "clean" architecture and requires a limited number of electrical and pneumatic connections for its installation.

Figure 2:
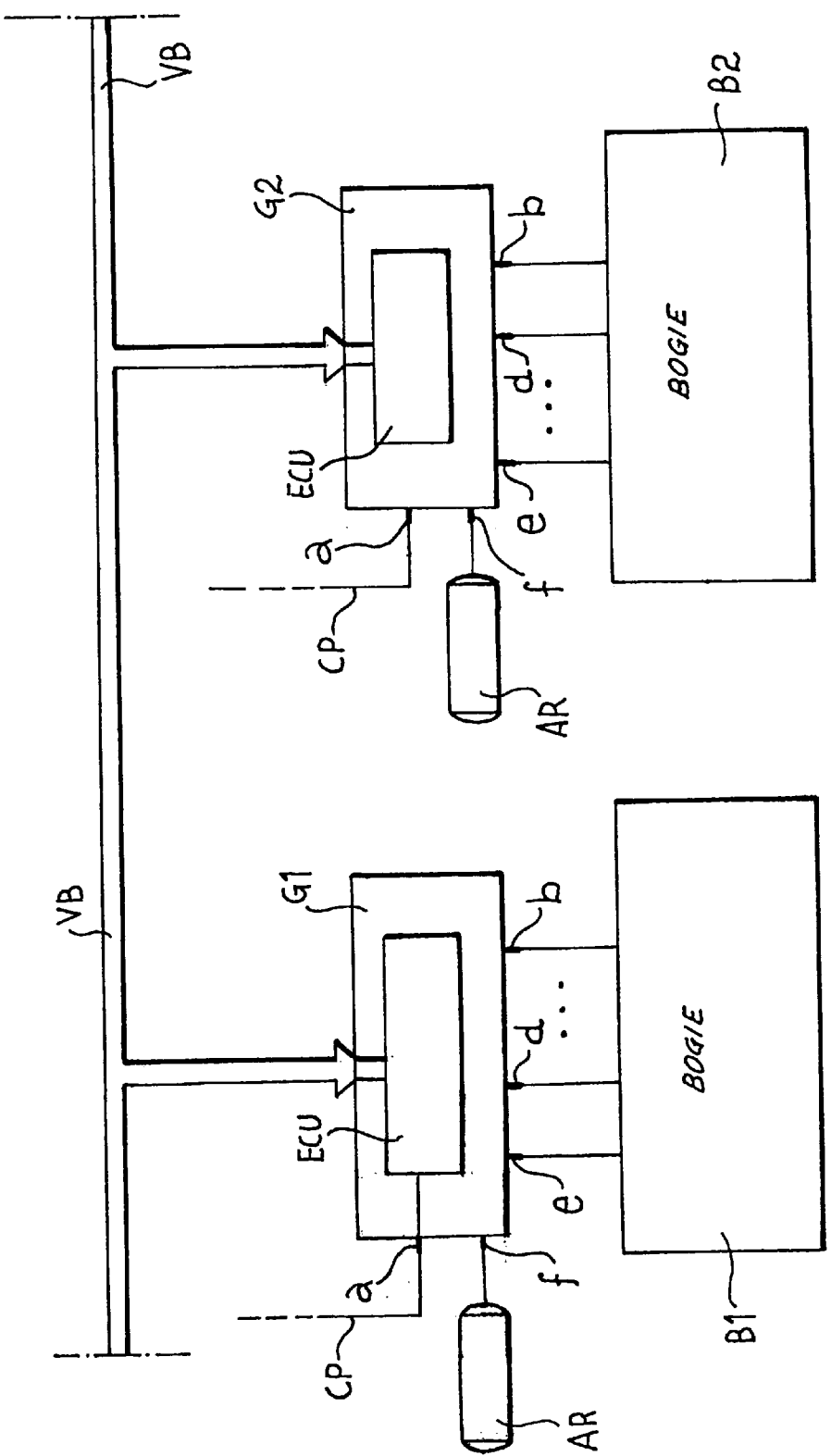
FIG. 2 is a block diagram which shows a variant embodiment of the system according to FIG. 1.

In FIG. 2 there is shown a variant embodiment in which each bogie B1 and B2 of the vehicle has respective associated electropneumatic control assemblies G1 and G2 the electronic communications and control units ECU of which are directly connected to the communications bus VB.

In braking systems according to FIGS. 1 and 2 the electropneumatic control assemblies G1 and G2 respectively associated with the bogies B1 and B2 can be physically installed directly on these bogies.

Figure 3:
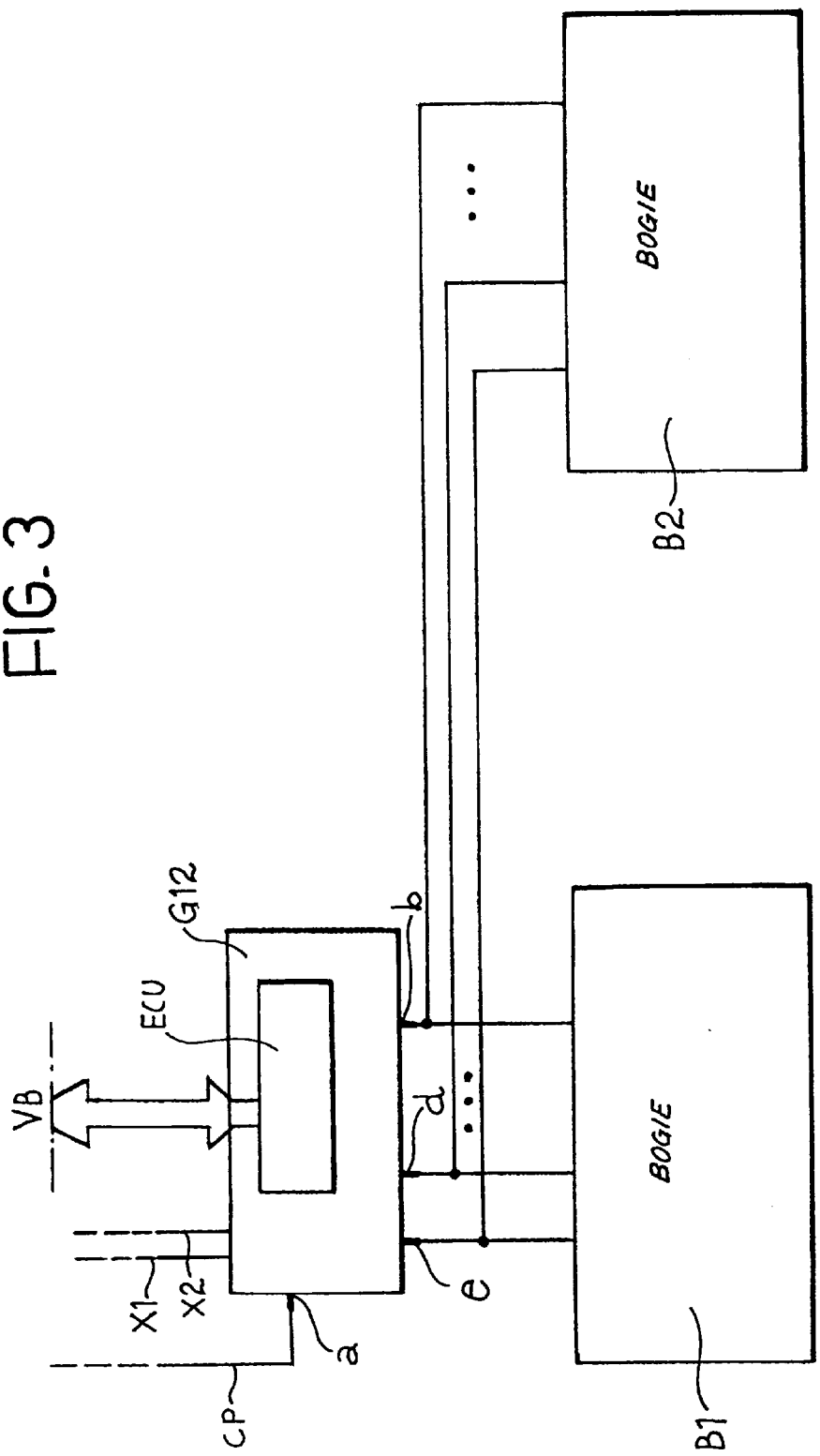
FIG. 3 is a block diagram which shows a further variant embodiment.

In FIG. 3 there is shown a variant embodiment in which the braking system of a vehicle RV comprises a single compact electropneumatic control assembly indicated G12, coupled to both bogies B1 and B2 of the vehicle. In this case the assembly G12 can be installed on one of the bogies, or under the vehicle, in an intermediate position between these bogies.

In the following description reference will be made to an embodiment in which each bogie of the railway or tram vehicle is associated with a respective electropneumatic control assembly. Those skilled in the art will, however, appreciate the simple modifications necessary to provide a braking system according to FIG. 3, that is to say comprising a single electropneumatic control assembly associated with all the bogies of the vehicle.

The invention likewise is applicable to railway or tram vehicles provided with only two axles, having a single electropneumatic control assembly.

Figure 4:
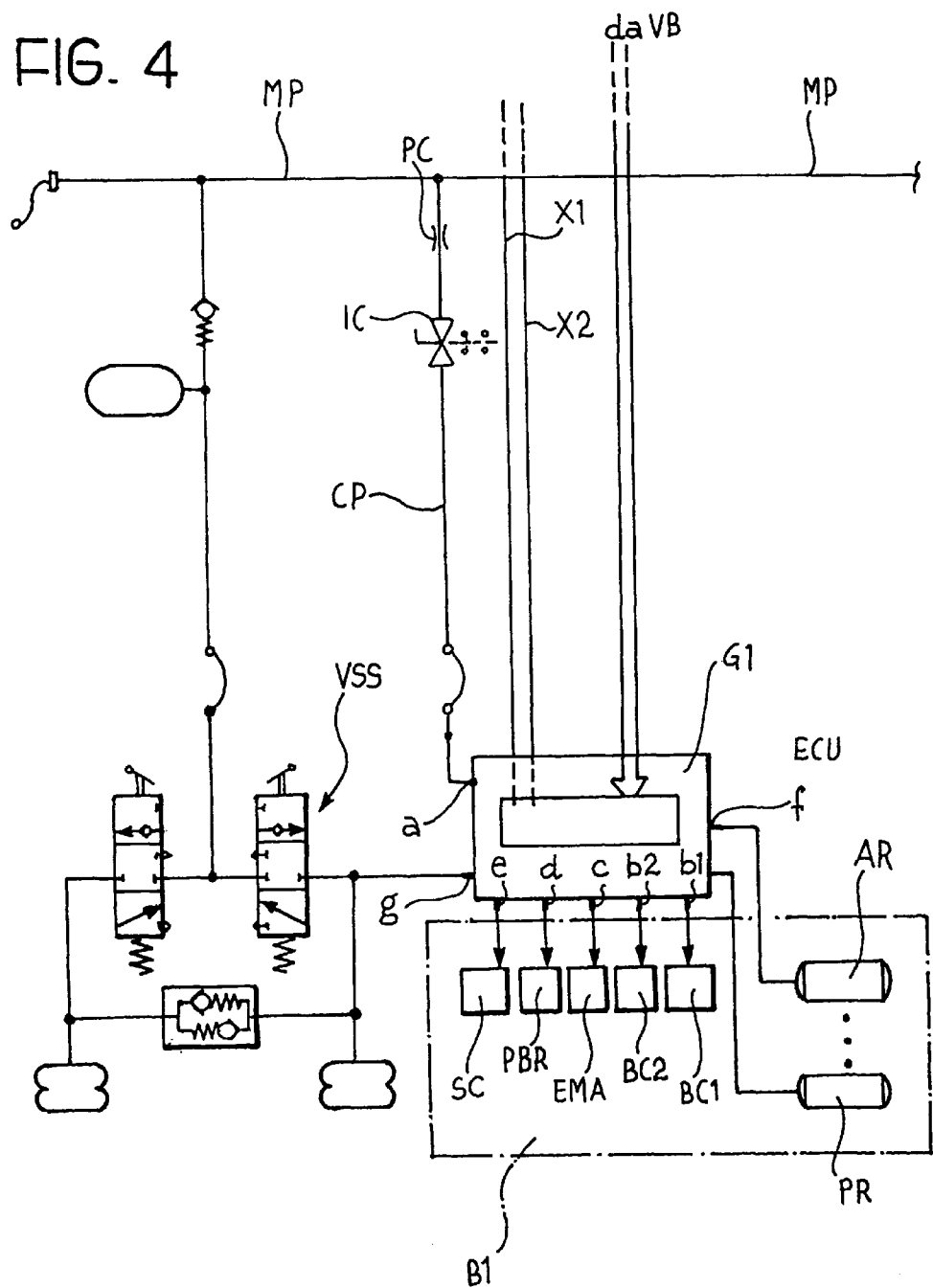
FIG. 4 is a block diagram of a system according to the invention.

In FIG. 4, in which there is shown only one bogie B1, several brake actuator devices with which the bogie is provided are shown graphically in the form of blocks, connected to the electropneumatic assembly G1 associated with it. In particular, the inlet/outlet connectors b1 and b2 of the assembly G1 are connected to the cylinders BC1 and BC2 of the service brakes and the supplementary brakes of the two axles of the bogie B1. The connection c of the assembly G1 is connected to the actuators EMA of the emergency brake, whilst the connectors d and e are connected to the cylinders PBR of the parking brake and, respectively, to the control cylinders SC of the cleaning shoes.

As is shown in FIG. 4, the electropneumatic assembly G associated with a bogie B can have an inlet g connected to the control system of the pneumatic suspension VSS of the vehicle, to extract information on the weight of the vehicle itself, usable in particular to regulate the brake pressure applied to the actuators in supplementary braking. Alternatively, this information on the weight of the vehicle can be provided to the electropneumatic assembly by other sensor or transducer devices of type known per se, such as load cell devices and the like associated with the vehicle itself.

Figure 5:
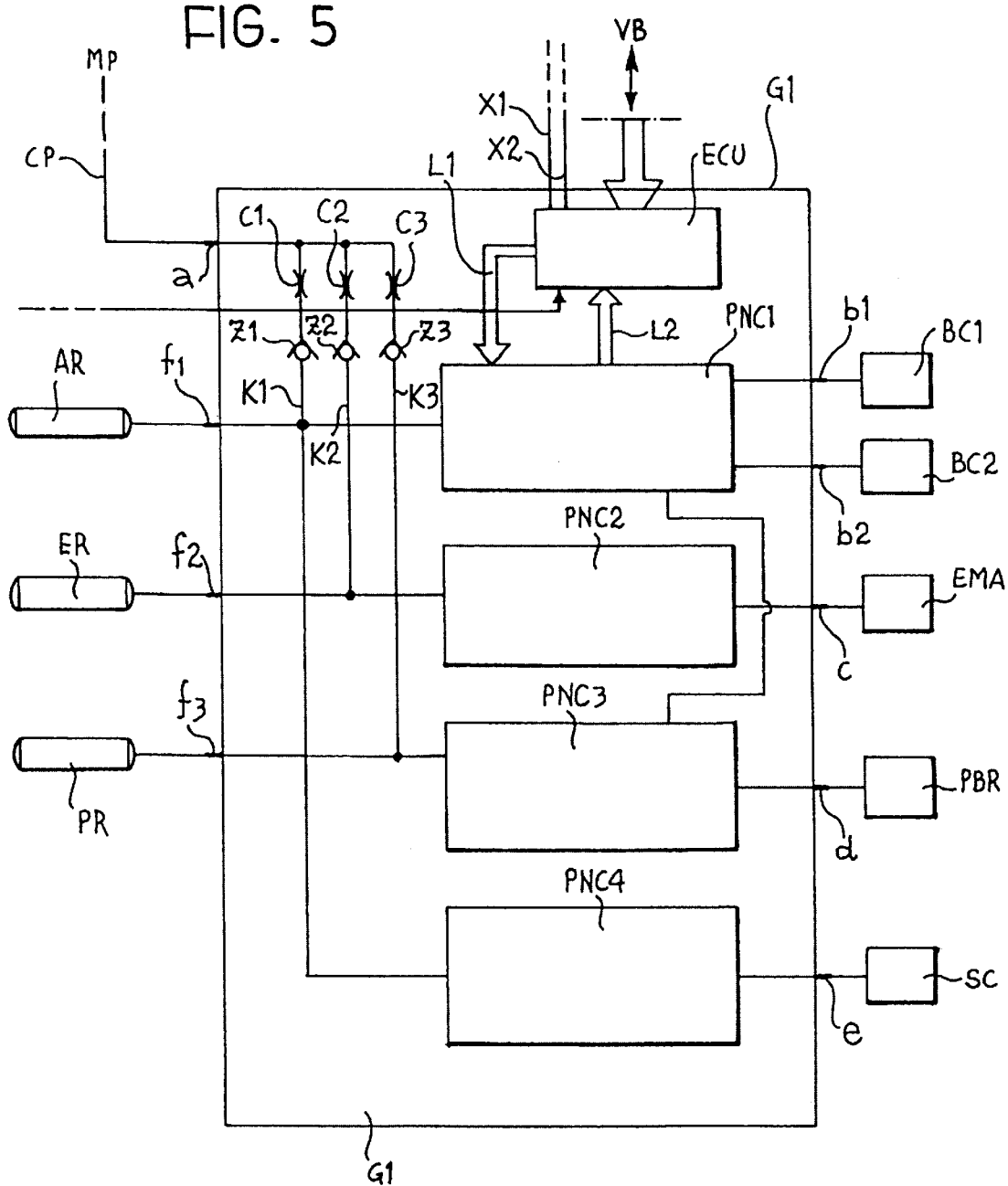
FIG. 5 is a block diagram which shows the structure of a compact electropneumatic control assembly comprised in a braking system according to the invention.

In the embodiments schematically illustrated in FIG. 5, an electropneumatic control assembly G1 has a plurality of input and output connectors f1, f2, f3 connected to specific auxiliary reservoirs indicated AR, ER and PR respectively. The reservoir AR is associated in particular with the service brake and the supplementary brake, as well as with control of the actuators associated with the cleaning shoes. The reservoir ER is associated with control of the actuators of the emergency brake whilst the reservoir PR is associated with the control of the actuators for the stationary or parking brake.

Within the assembly G1 the connectors f1, f2, f3 are coupled to the input connector a, and therefore to the main duct MP via respective lines or ducts K1, K2 and K3, with the interposition of respective throttles c1–c3 and respective non-return valves z1–z3.

The electropneumatic assembly G1 of FIG. 5 includes four pneumatic control circuits indicated PNC1 to PNC4.

The pneumatic circuit PNC1 is connected between the connection f1 and the connectors b1 and b2 and controls activation and disactivation of the cylinders BC1 and BC2 of the service and supplementary brakes.

The pneumatic circuit PNC2 is connected between the connector f2 and the connector c and is intended to control the activation and disactivation of the emergency brake actuators EMA.

The pneumatic circuit PNC3 is disposed between the connectors f3 and d and is intended to control the stationary or parking brake actuators PBR.

Finally, the pneumatic circuit PNC4 is interposed between the connectors f1 and e, and controls the actuators SC associated with the cleaning shoes.

Although in the diagram of FIG. 5, as well as in the diagrams of the subsequent FIGS. 6 to 11, there are three auxiliary reservoirs (AR, ER and PR) it will be understood that only one of these (the reservoir AR) is sufficient.

The pneumatic control circuits PNC1 to PNC4 include respective controlling solenoid valves, controlled by the electronic communication and control unit ECU in ways which will be described hereinafter. In FIG. 5, L1 indicates a plurality of conductors by which the electronic unit ECU is connected to the controlling solenoid valves of the pneumatic control circuit PNC1. In order not to overload the drawings, in FIG. 5 the corresponding connections by which the unit ECU controls the command solenoid valves of the other pneumatic control circuits PNC2 to PNC4 have not been shown.

The pneumatic circuit PN1 further includes, as will be seen hereinafter, sensor devices or transducers intended to provide the unit ECU with electrical signals indicative of quantities or conditions monitored in these circuits. In FIG. 5 L2 generally indicates the lines which connect the sensors or transducers of the circuit PNC1 to the unit ECU. On the other hand the lines which connect the sensors or transducers of the other pneumatic circuit to the unit ECU have not been shown, again for the purpose of not overloading the drawing.

In a preferred embodiment the pressure transducers (hereinafter indicated T . . . ) associated with the various pneumatic circuits are physically mounted directly on, or on circuit cards or boards of, the unit ECU and are coupled to the said pneumatic circuit by means of pneumatic ducts.

Figure 6:
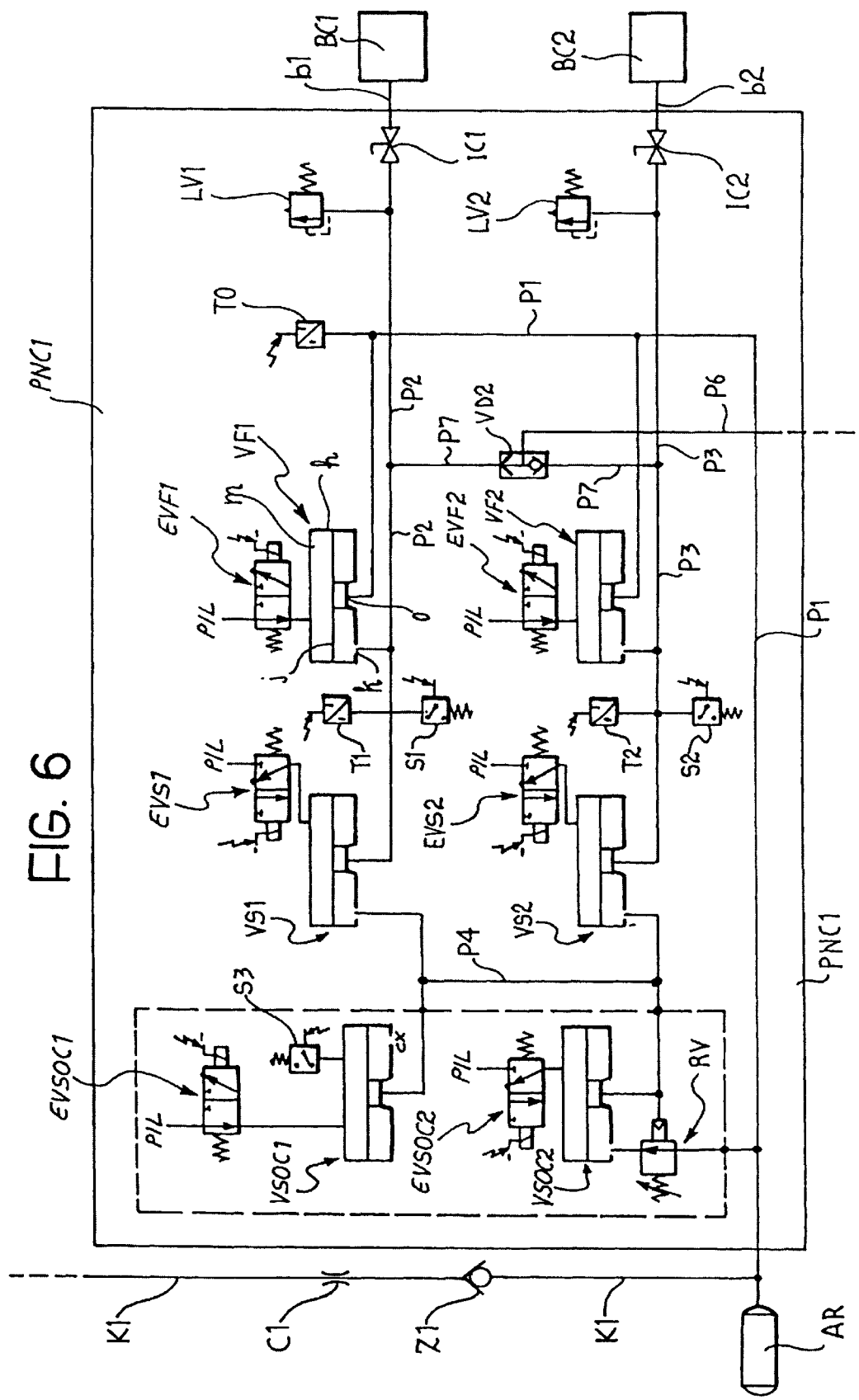
FIGS. 6 to 9 are pneumatic circuits comprised in a control it according to FIG. 5.

With reference to FIG. 6 a first embodiment of the pneumatic control circuit PNC1 will now be described.

The circuit PNC1 of FIG. 6 comprises two pneumatic valves VF1 and VSF1, respectively for the application and release of the service braking pressure to the cylinders BC1 of the brakes of one axle of a bogie, and corresponding valves VF2 and VSF2 for the application and release of the service braking pressure to the cylinders BC2 of the brakes of the other axle of the bogie. The valves VF1 and VF2 are identical to one another and each of these (for example the valve VF1) comprises a body h within which is a membrane shutter j which controls the communication between the inlet k and the outlet o of the valve. The membrane j defines, with respect to the body h, a pilot chamber m to which is connected a solenoid control valve EVF1 which in the example illustrated is of the two-way, two-position type. In the excited condition (illustrated in FIG. 6) the solenoid valve EVF1 determines introduction into the chamber m of a piloting pressure Pil derived from the auxiliary reservoir AR. In this condition the communication between the inlet k and the outlet o of the valve is prevented. When the said solenoid valve is de-excited the pilot chamber m is put into communication with the discharge, and passage of air under pressure from the inlet k to the outlet o of the valve VF1, or vice versa is now allowed.

The inlets of the valves VF1 and VF2 are connected to the reservoir AR by means of a duct p1.

The outlets of the said valves VF1 and VF2 are connected to respective cylinders BC1 and BC2 by means of ducts p2 and p3. Between the outlets of the valves VF1 and the cylinders BC1 and BC2 respectively are connected respective pressure-limiting valves (pressure relief valves) LV1 and LV2, and interception taps IC1 and IC2. The brake release valves VS1 and VS2 are similar to the valves VF1 and VF2 and to these are associated respective control solenoid valves EVS1 and EVS2. In the de-excited condition illustrated in FIG. 6 the solenoid valves EVS1 and EVS2 connect the pilot chambers of the associated valves VS1 and VS2 or vice versa. When the solenoid valves EVS1 and EVS2 are excited they cause supply of air under pressure to the pilot chambers of the valves VS1 and VS2 so that the inlets of the said valves are intercepted and de-coupled from the corresponding outlets.

The outlets of the brake valves VF1 and VF2 are connected to the inlets of the corresponding brake release valves VS1 and VS2. The outlets of these latter are connected together by means of a connection duct p4, and are further connected to the inlets of the further two valves (supplementary valves) VSOC1 and VSOC2 similar to the above.

The outlet of the valve VSOC1 communicates with the atmosphere and its pilot chamber is connected to a control solenoid valve EVSOC1. In the de-excited position (illustrated) the solenoid valve EVSOC1 maintains the valve VSOC1 closed, whilst in the excited condition it allows it to open.

The pilot chamber of the valve VSOC2 is connected to a control solenoid valve EVSOC2 which in the de-excited condition (illustrated) allows the valve VSOC2 to open, and in the excited condition prevents it from opening.

The outlet from the auxiliary reservoir AR is connected to the valve VSOC2 via a pressure regulation valve VR arranged to regulate the pressure sent to the valve VSOC2 as a function of the weight of a vehicle in a manner known per se.

The brake solenoid valves EVF1, EVF2, as well as the brake release solenoid valves EVS1 and EVS2 and the supplementary solenoid valves EVSOC1 and EVSOC2 are controlled by the electronic unit ECU of the electropneumatic assembly of which the circuit PNC1 forms part. This pneumatic circuit has various sensors or transducers associated therewith, connected (in a manner not shown) to the electronic unit ECU.

A pressure transducer TO signals the pressure in the duct p1, and thus the pressure available in the reservoir AR. Two pressure transducers T1 and T2 connected to the outlets of the brake valves VF1 and VF2 signal to the unit ECU the brake pressure applied to the cylinders BC1 and BC2 respectively. Moreover, two pressure sensitive switches S1 and S2, likewise connected to the outlets of the valves VF1 and VF2, provide the unit ECU with information indicative of the presence or absence of pressure in the cylinders BC1 and BC2 respectively.

A pressure sensitive switch S3 is associated with the pilot chamber of the valve VSOC1 to signal to the unit ECU if there is or is not pressure in this pilot chamber and thus if the valve VSOC1 is open or closed.

The pneumatic circuit PNC1 described above is arranged to operate under the control of the unit ECU in the following manner.

In the absence of service braking and supplementary braking the solenoid valves EVSOC1 and EVSOC2 are excited so that the valve VSOC1 can be open whilst the valve VSOC2 is maintained closed. In these conditions the brake solenoid valves EVF1 and EVF2 and the brake release solenoid valves EVS1, EVS2 are de-excited.

In these conditions, when the unit ECU receives service brake command signals via the communications bus VB it causes excitation of the brake and brake release solenoid valves. The valves VF1, VF2 are thus opened, whilst the valves VS1 and VS2 are held closed. In this condition air under pressure flows from the reservoir AR to the brake cylinders BC1 and BC2 via the valves VF1 and VF2. When the desired brake pressure is achieved (which the unit ECU detects by information provided by the transducers T1 and T2) this unit de-excites the brake solenoid valves EVF1 and EVF2, and maintains the brake release valves EVS1, EVS2 excited. The brake pressure applied to the cylinders BC1 and BC2 is thus maintained.

For release of the service brake pressure the unit ECU de-excites both the brake valves EVF1, EVF2 and the brake release valves EVS1 and EVS2: the pressure in the brake cylinders BC1 and BC2 can now discharge to atmosphere through the ducts p2, p3, the valves VS1, VS2, the duct p4 and the valve VSOC1.

Figure 12:
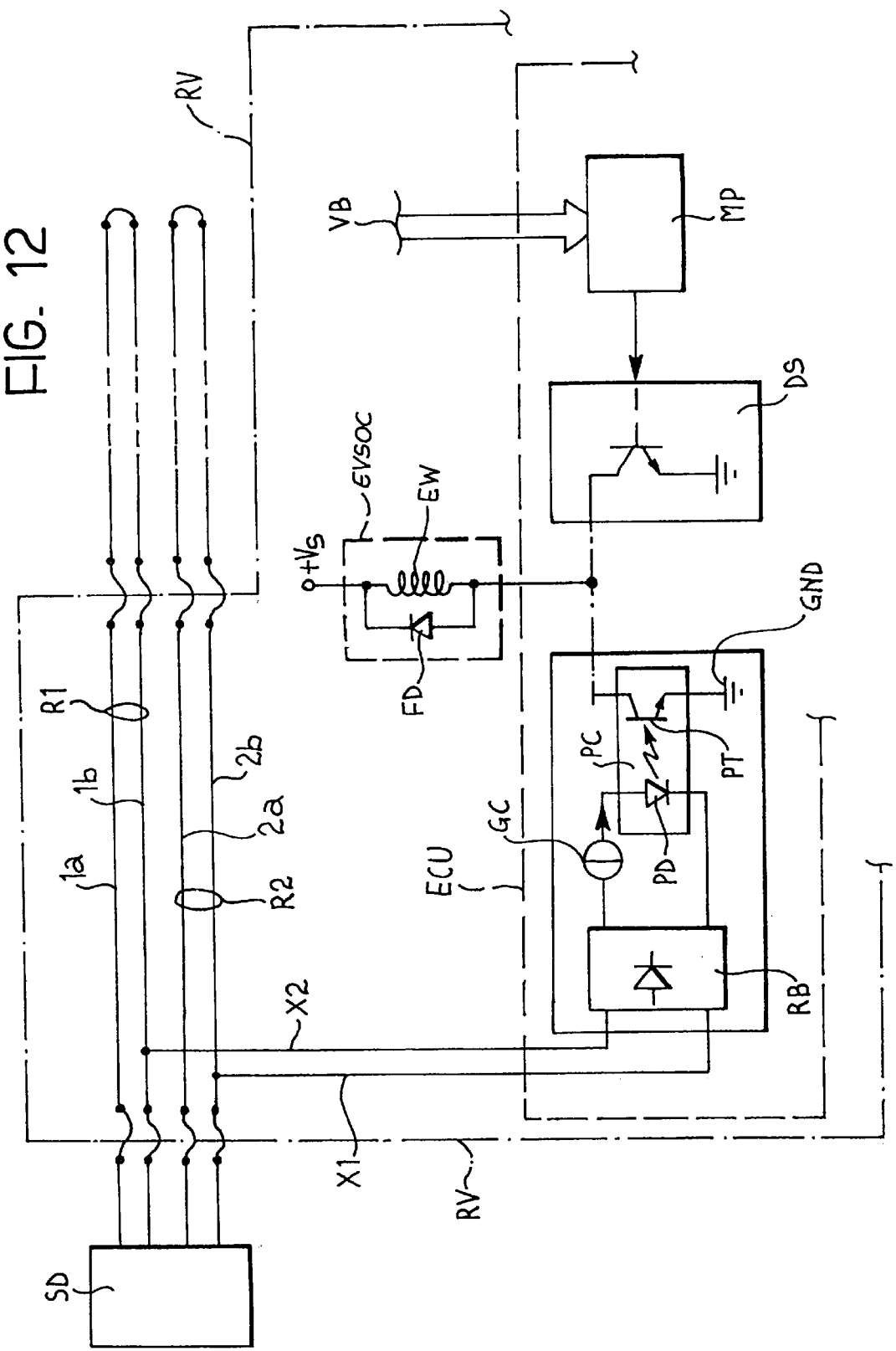
FIG. 12 is a diagram which illustrates a double control loop for controlling solenoid valves for the supplementary brake.

The circuit PNC1 also allows actuation of the supplementary brake which is activated either following a command received from the unit ECU via the bus VB or else (as will be explained better hereinafter) in the case of interruption of the double safety loop R1, R2 (FIGS. 1 and 12).

In either case, the supplementary brake is put into operation by de-excitation of the solenoid valves EVSOC1, EVSOC2 following which the valve VSOC1 is closed and the valve VSOC2 is open. In this condition compressed air coming from the reservoir AR passes—with a pressure "weighted" by the regulation valve RV—through the valve VSOC2 and thus through the valve VS1 as well as the valve VS2 (which are openable in that the associated solenoid valves are de-excited) and arrives at the brake cylinders BC1 and BC2.

During service braking the pressure sensitive switch S3 signals to the unit ECU that the valve VSOC1 is closed and the unit ECU then inhibits excitation of the brake valves EVF1, EVF2 whereby to avoid the simultaneous application of the service brake and the supplementary brake.

In particular, during service braking the anti-skid function is achievable by exciting and de-exciting the brake solenoid valves EVF and brake release solenoid valves EVS alternately. During supplementary braking the anti-skid function is achievable by exciting and de-exciting the solenoid valves EVSOC1 and EVSOC2 respectively.

It is to be noted that the structure of the pneumatic circuit PNC1 is such that the anti-skid function can be controlled axle-by-axle independently of the brake pressure in the service brake, whilst in supplementary braking the brake pressure is controlled in the same way for all axles of the same bogie.

As previously mentioned, the unit ECU is preferably arranged in such a way as normally to prevent the contemporaneous application of the service brake and the supplementary brake. However, whenever this has to happen, following a malfunction or breakdown, the pneumatic circuit PNC1 described above is such that the brake actuators BC1 and BC2 receive a pressure equal to the higher of the pressure of the service brake and the pressure of the supplementary brake.

Figure 7:
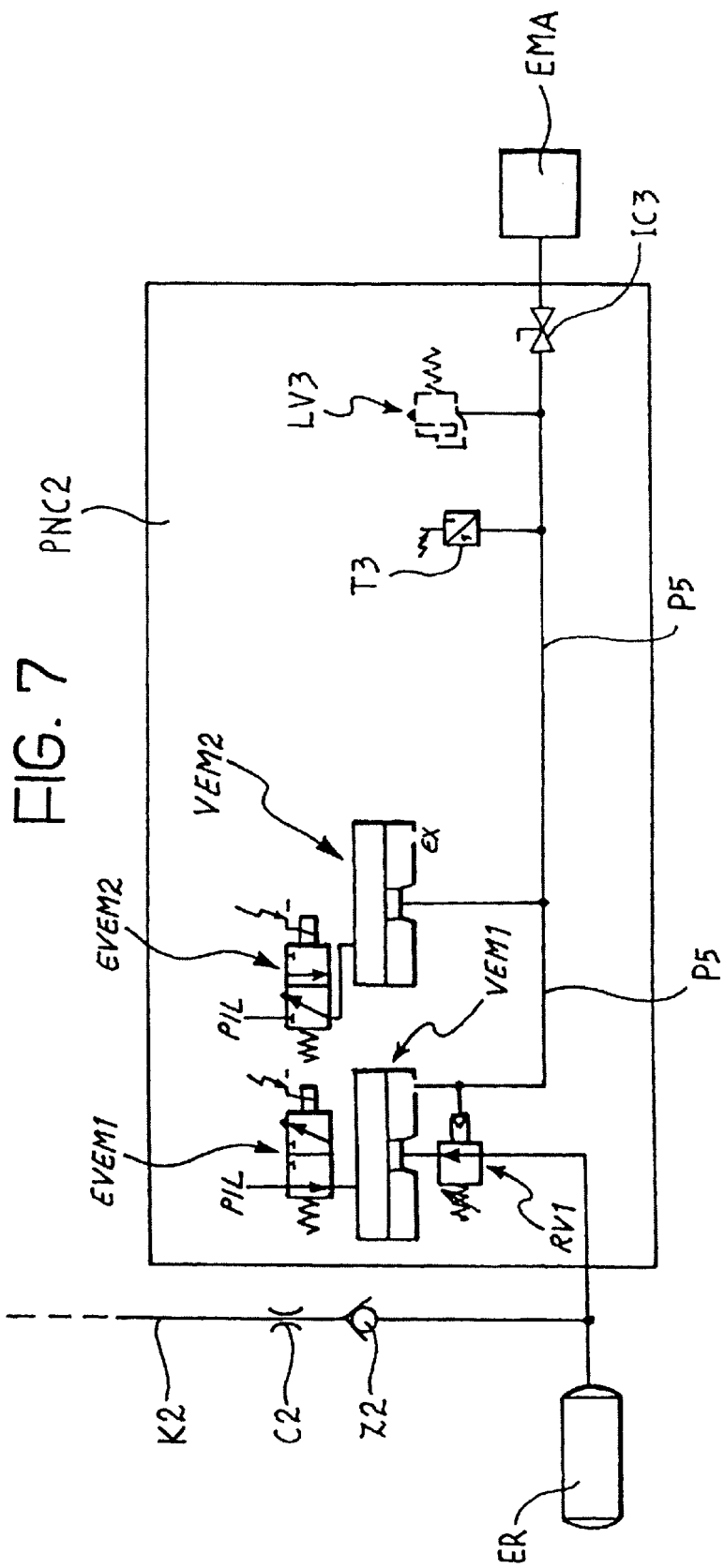

With reference to FIG. 7 there will now be described an embodiment of the pneumatic circuit PNC2 for controlling the activation of the emergency brake actuators EMA.

In the embodiment illustrated the circuit PNC2 comprises a valve VEM1 which is similar to the pneumatic valve already described with reference to FIG. 6, and is controlled by a solenoid valve EVEM1 in a manner such that when this latter is de-excited (excited) the valve VEM1 is closed (openable). The inlet to the valve VEM1 is connected to the reservoir ER via a pressure regulating valve RV1 arranged to suitably regulate the pressure. The outlet of the valve VEM1 is connected to the actuators EMA of the emergency brake by means of a duct p5 in which is fitted an interception tap IC3.

A pneumatic valve VEM2 similar to the valve VEM1 has its input connected to a branch of the duct p5 and its output communicating with the atmosphere. This valve is associated with a control solenoid valve EVEM2 which is the de-excited (excited) condition allows (prevents) opening thereof. The duct p5 is also associated with a pressure transducer T3 connected to the unit ECU and a possible pressure limiting valve LV3.

The control unit ECU is arranged to control activation of the emergency braking actuators EMA through the solenoid valves EVEM1, EVEM2. When these solenoid valves are simultaneously excited the compressed air passes from the reservoir ER to the actuators EMA through the valve VEM1 and at a suitable pressure from the valve RV1. When the said solenoid valves are then de-excited the pressure applied to the actuators EM1 discharges to atmosphere though the valve VEM2.

Figure 8:
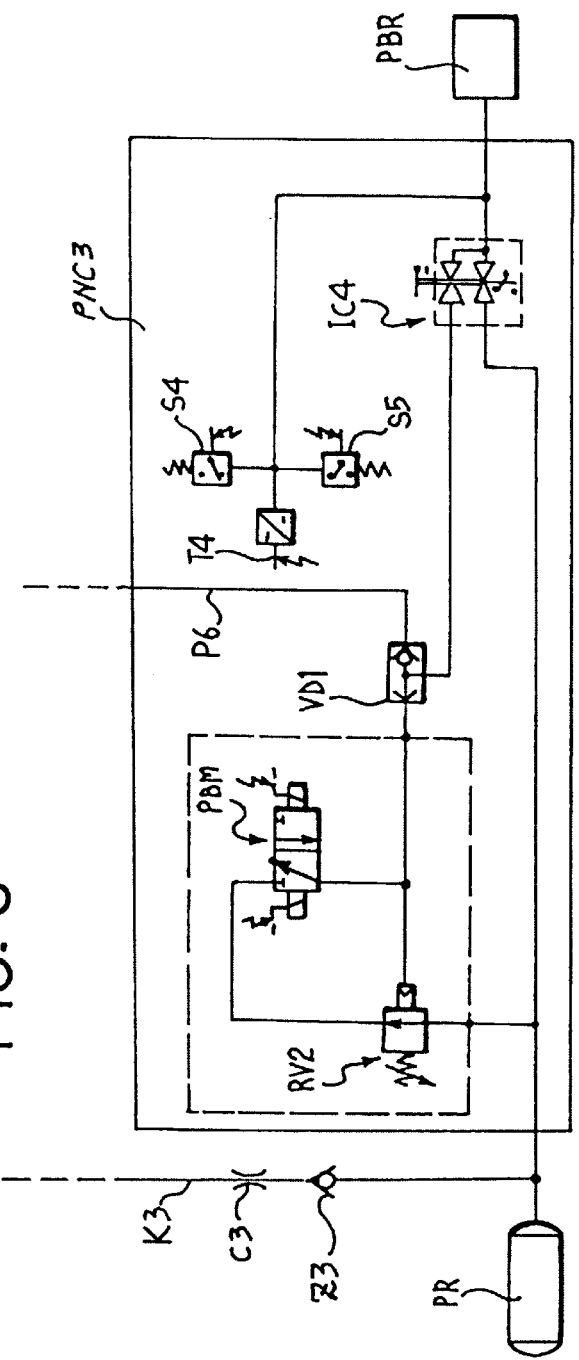

In FIG. 8 there is shown an embodiment of the pneumatic circuit PNC3 for controlling the actuators PBR for the standing or parking brake.

In the embodiment illustrated the reservoir PR is connected to a bistable solenoid valve PBM via a valve RV2 which suitably regulates the pressure as a function of the weighted characteristics of the actuators. The output of the bistable solenoid valve PBM is connected to a selector valve VD1 in turn connected to the actuators PBR for the parking brake via a first section of a double interception tap IC4.

The output from the reservoir PR is moreover connected to the actuators PBR via the second section of the double interception tap IC4.

The actuators PBR are of the cylinder and spring type and are deactivated when the cylinder is supplied with a pressure, whilst they are activated (by the effect of the springs) when this pressure is released.

The bistable solenoid valve PBM allows connection of the actuators PBR selectively to the reservoir PR or to atmosphere, and thus allows them to be deactivated and activated respectively.

The pressure transducer T4 and low and high threshold pressure-sensitive switches S4 and S5 respectively allow the control unit ECU to detect the presence or absence of pressure at the actuators PBR, and the value of this pressure.

As an alternative to the embodiment illustrated in FIG. 8, an assembly of valves and solenoid valves the same as or similar to that previously described in relation to the control of the supplementary brake can be used for the control of the standing or parking brake actuators PBR.

The valve VD1 is connected via a duct p6 to a similar valve VD2 of the pneumatic circuit PNC1 (FIG. 6), which is interposed in a duct p7 which interconnects the ducts p2 and p3. This arrangement allows a part of the air under pressure intended for the cylinders BC1 and BC2 during service braking to reach the actuators PBR of the parking brake. However, when only the parking brake is activated the valves VD1, VD2 de-couple the pneumatic circuit PNC1 from the circuit PNC3.

Figure 9:
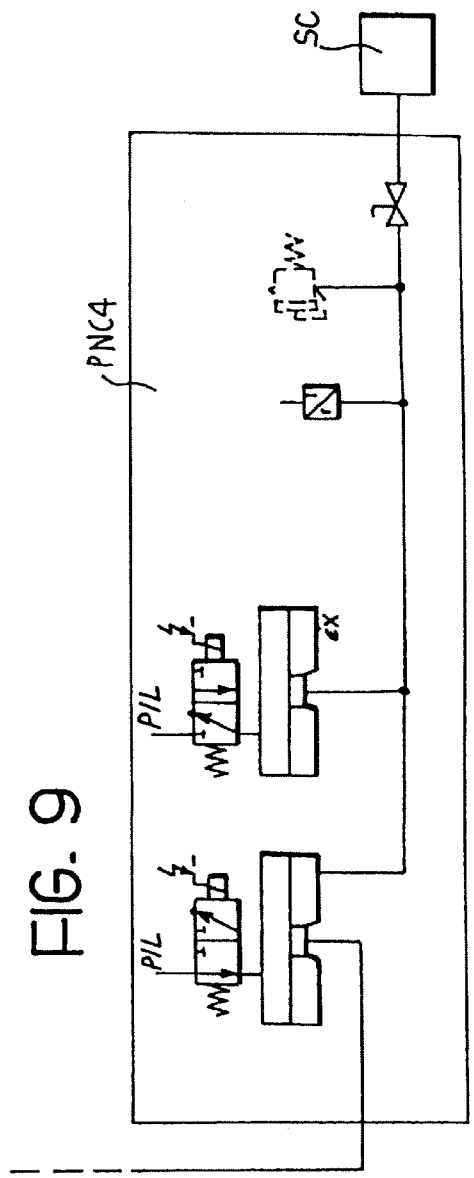

In FIG. 9 there is shown an embodiment of the pneumatic circuit PNC4 for controlling the cylinders SC associated with the cleaning shoes. The circuit PNC4 of FIG. 9 is substantially identical to the circuit PNC2 shown in FIG. 7 with respect to which it differs only by the absence of the regulator valve RV1. Therefore the circuit PNC4 and its operation will not be further described.

Figure 10:
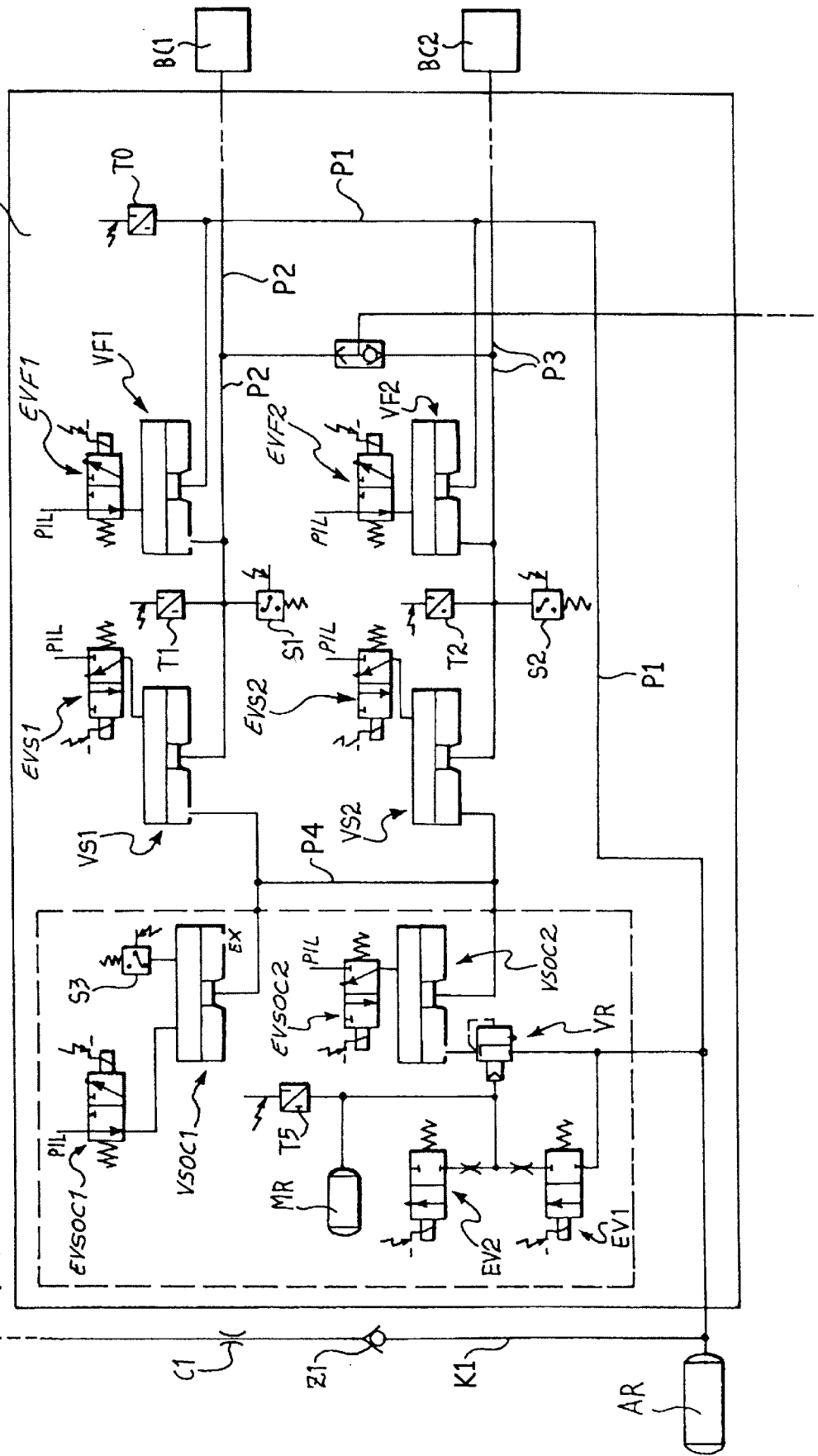
FIGS. 10, 10a and 11 are variant diagrams of embodiments of the pneumatic circuit according to FIG. 6.

In FIG. 10 there is shown a variant embodiment of the pneumatic circuit PNC1. In this figure the elements and parts already described with reference to FIG. 6 have again been given the same alphanumeric reference symbols.

In the embodiment of FIG. 10 the reservoir AR is connected to the valve VSOC2 by a pneumatic relay valve VR the piloting input to which is connected to a memory reservoir MR having a defined volume. The reservoir MR is connectable to the reservoir AR via a two-way, two-position solenoid valve EV1. The reservoir MR can be connected to the atmosphere via a further two-way, two-position solenoid valve EV2. A pressure transducer T5 coupled to the reservoir MR provides the control unit ECU with signals indicative of the pressure in this reservoir.

In an electropneumatic unit including a circuit PNC1 according to FIG. 10 the electronic unit ECU is connected to a sensor capable of providing it with signals indicative of the weight of the vehicle. This sensor can for example be a load cell or a pressure sensor associated with the pneumatic suspensions of the vehicle. On the basis of the information provided by this sensor the unit ECU, by piloting the solenoid valves EV1 and EV2 causes a pressure indicative of the weight of the railway or tram vehicle to be stored in the reservoir MR. This pressure "memorised" in the reservoir MR is utilised for piloting the relay valve VR and thus for regulation of the braking pressure applied to the cylinders BC1 and BC2 in supplementary braking.

Figure 10A:
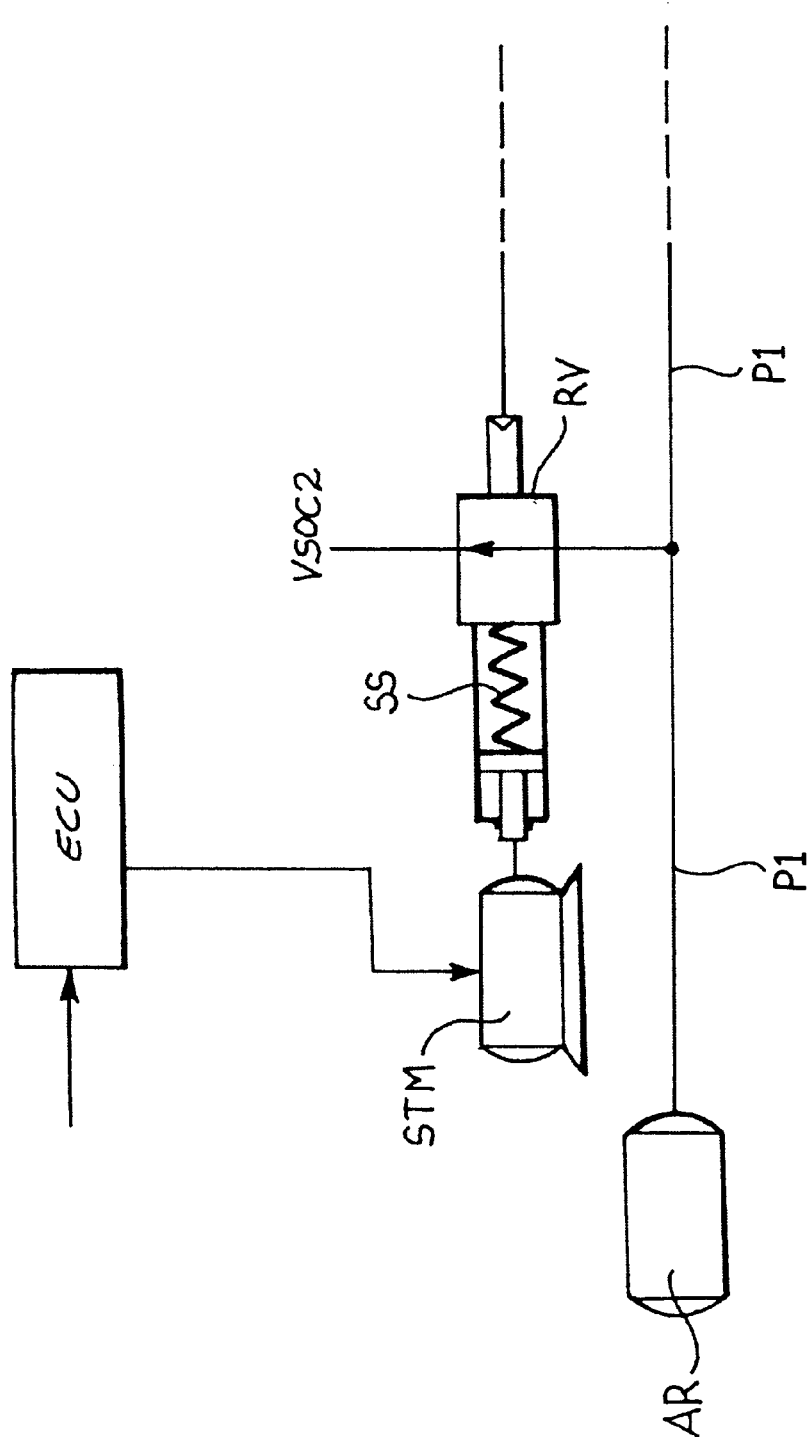

The pneumatic "memorising" of the weight of the railway or tram vehicle makes it possible to regulate the supplementary braking pressure even in the case of breakdown or malfunction of the electronic parts of the electropneumatic control unit. Another method of memorising the weight of the vehicle is schematically illustrated in FIG. 10a: on the basis of an electric weight signal q provided by a transducer the unit ECU controls an electric stepping motor STM in such a way as to modify correspondingly the load of the spring SS of a pressure regulating valve RV interposed between the reservoir AR and the valve VSOC2 as in the diagram of FIG. 6.

Figure 11:
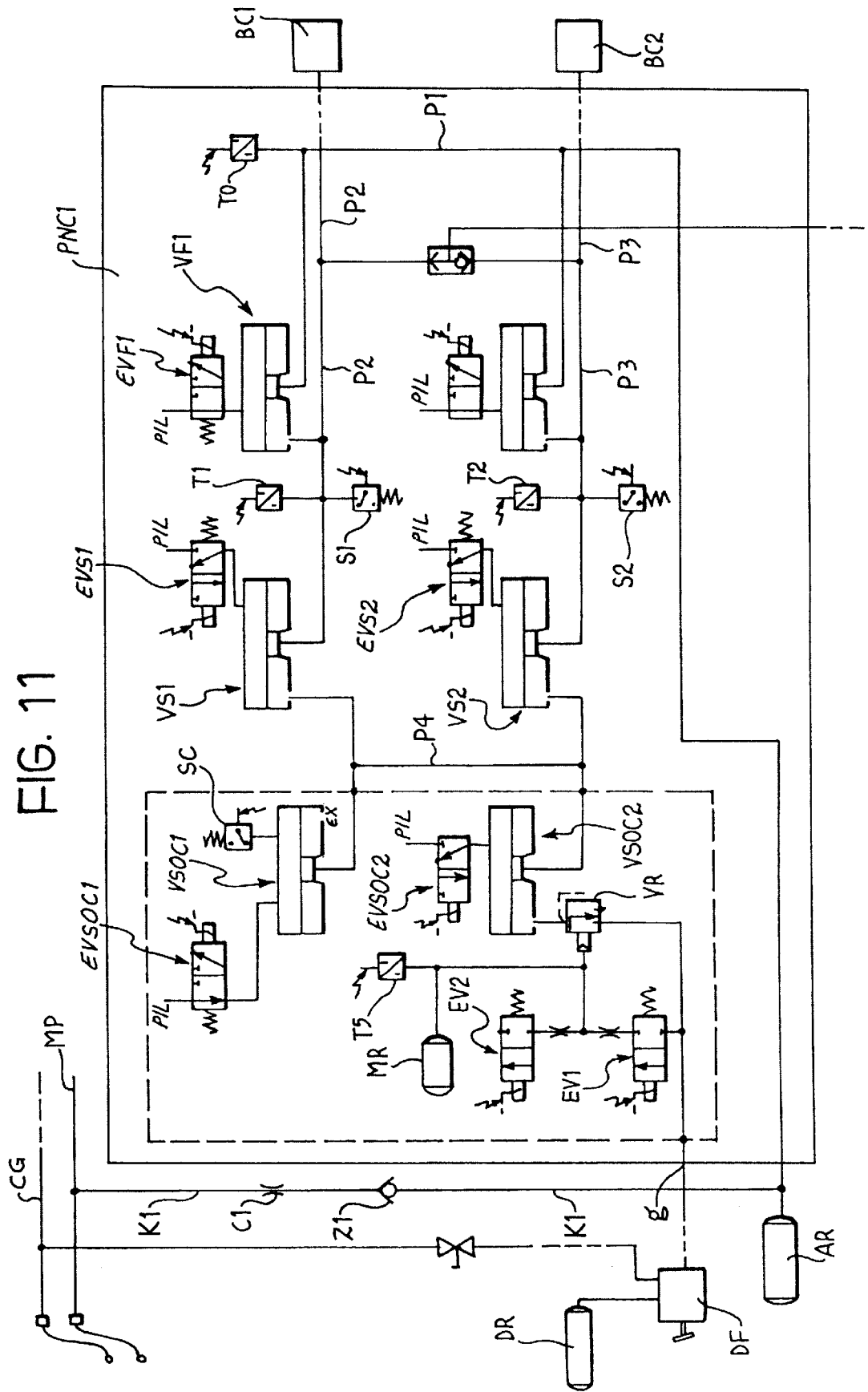

In FIG. 11 there is shown a further variant embodiment of the pneumatic circuit PNC1. The circuit PNC1 of FIG. 11 is intended for use in a vehicle the braking system of which comprises, as well as the main duct MP, a general pneumatic brake duct indicated CG and a brake command distributor DF connected to the said general duct CG and to an associated pressure reservoir DR. The circuit PNC1 of FIG. 11 has a structure corresponding to that of the circuit shown in FIG. 10 from which it differs by the fact that the reservoir AR is de-coupled from the relay valve VR and from the solenoid valve EV1 which are instead coupled to the output of the braking distributor DF in correspondence with a pneumatic input g of the circuit.

In a manner known per se, when the pressure in the general duct CG falls below a determined value the brake distributor DF sends air under pressure coming from the reservoir DR to the input g of the circuit PNC1 giving rise to braking if the supplementary solenoids have been previously de-energised in a manner corresponding to that previously described with reference to FIGS. 6 and 10.

Naturally this functional option with intervention of the distributor is valid even if the mentioned weighing of the vehicle is not present but all the other previously explained forms of weighing are.

In FIG. 12 there is shown a diagram which illustrates the way the solenoid valves EVSOC of the pneumatic circuit PNC1 is controlled.

As has already previously been mentioned, these solenoid valves are normally excited and are de-excited to apply the supplementary brake. De-excitation of these solenoid valves can be controlled by the electronic control unit ECU by signals coming from the bus VB or by the reduction in the potential difference between the two safety loops R1 and R2.

As is seen in FIG. 12, to control the solenoid valves EVSOC in this way the conductors x1 and x2 connected to the return conductors 1b and 2b respectively of the safety loop R1 and R2 are connected to a rectifier circuit RB. At the output of this rectifier circuit there is connected a current generator which supplies current to the photodiode PD of a photocoupler PC. The phototransistor PT of which is connected between a terminal of the excitation winding EW of a general solenoid valve EVSOC and a ground conductor GND. The other terminal of the winding EW is connected to a voltage source $V_s$. In a manner known per se, a re-circulation diode FD is connected in parallel with the winding EW.

When the nominal potential difference is present between the safety loops R1 and R2 the current generator GC supplies current to the photodiode PD and the phototransistor PT is conductive and maintains the lower terminal of the windings EW connected to ground. The solenoid valve EVSOC is therefore exited. Upon the said potential difference falling, following an interruption in the safety loops R1 and R2 in any of the vehicles of the railway train, the current generator GC becomes inactive such that the phototransistor PT turns off and the solenoid valve EVSOC becomes de-excited. De-excitation of this solenoid valve can however be caused, in a manner which is independent of the state of the safety loops R1 and R2, upon a command imparted by a microprocessor MP comprised in the electronic unit ECU, via a transistorised pilot stage DS.

Figure 13:
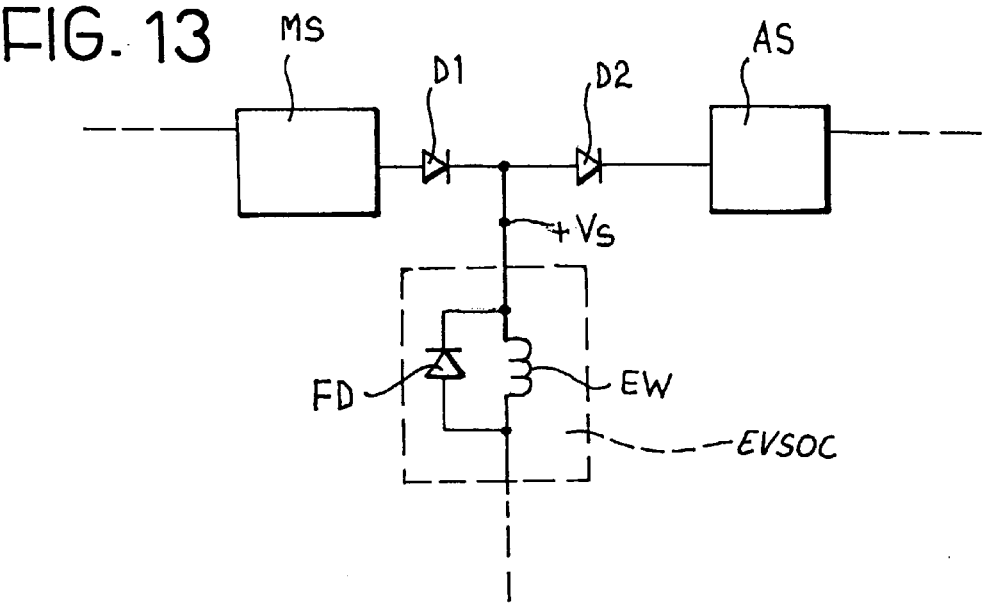
FIG. 13 is an electric diagram of a solenoid valve supply circuit comprised in the system according to the invention.

Conveniently, as shown in FIG. 13, for supply of the voltage $V_s$ to the solenoid valves EVSOC there is used a main supply circuit MS and an auxiliary supply circuit AS connected to the windings EW of these solenoid valves in an OR configuration, for example by means of diodes D1 and D2 connected in the manner illustrated. The redundancy of the voltage supply makes it possible to avoid a local de-excitation debt of the supplementary solenoid valves EVSOC.

Figure 14:
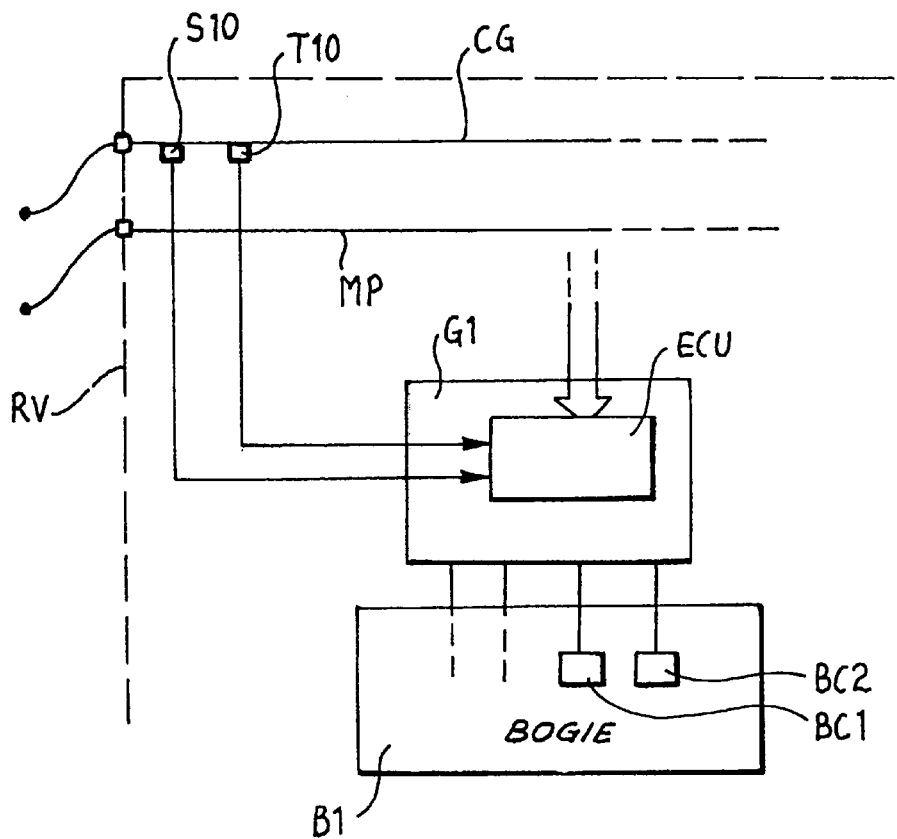
FIG. 14 is a diagram relating to a variant embodiment of a system according to the invention.

An electropneumatic brake control assembly according to the invention makes it possible to perform by electronic means the function of a traditional brake distributor coupled to the general brake duct. This possibility will now be illustrated with reference to FIG. 14. The railway or tram vehicle RV of FIG. 14 is traversed, as well as by the main brake duct MP, also by a general brake duct CG. This duct is associated with a pressure transducer T10 and a pressure-sensitive switch S10 connected to the electronic unit ECU of the or each electropneumatic control assembly with which the vehicle RV is provided.

When the transducer T10 signals a pressure in the general duct CG less than a predetermined value the electronic control unit ECU activates the brake actuators BC1 and BC2 in the manner previously described with reference to FIGS. 6 and 10.

The pressure-sensitive switch S10 serves to allow the actuation of the "rapid" or emergency brake.

In general the or each electropneumatic control assembly of the braking system according to the invention is enclosed in a container or support casing. The electronic control unit ECU of the or each electropneumatic assembly is conveniently arranged to control the solenoid control valves associated with the various pneumatic circuits by means of electronic switches such as, for example, MOSFET transistors. The unit ECU can in particular be advantageously arranged to pilot these electronic switches with average value square wave command signals, and in particular having a controlled variable duty cycle so as to reduce the heat dissipation in the said command solenoid valves.

Figure 15:
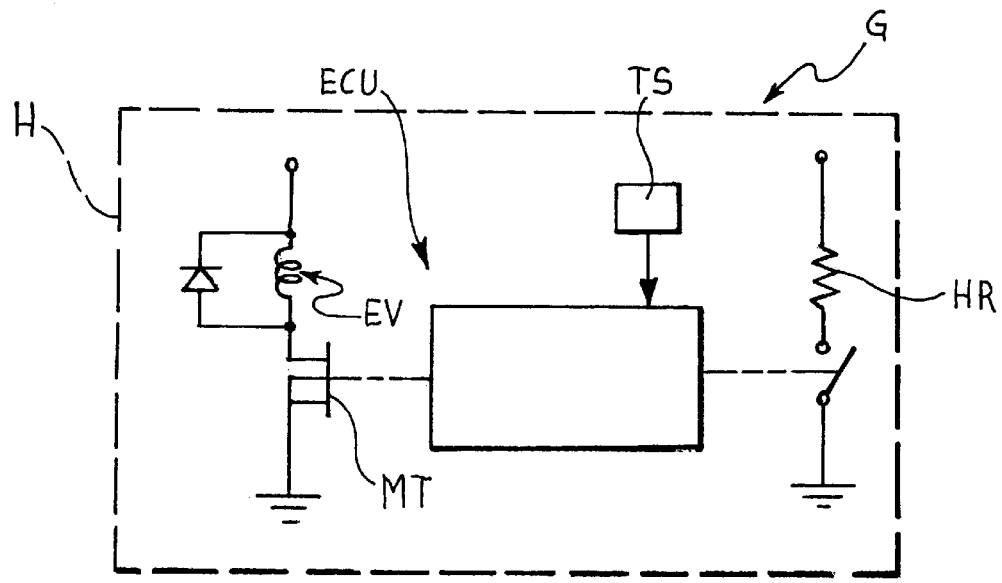
FIGS. 15 and 16 are diagrams of arrangements adopted for controlling the solenoid valves and for controlling the temperature within the casing of an electropneumatic control unit comprised in a braking system according to the invention.

In FIG. 15 there is shown a general electropneumatic control assembly G the casing or support container of which is indicated H. In this figure there is shown a general solenoid control valve indicated EV piloted by means of an associated MOSFET transistor MT. As is shown in this drawing, the unit ECU can conveniently be connected to a temperature sensor TS operable to provide it with signals indicative of the temperature within the casing or container H. The unit ECU can be arranged to control the average value or duty cycle of the square wave signals, with which the various solenoid control valves are piloted, as a function of the temperature indicated by the sensor TS, in such a way as to reduce or if necessary increase the heat dissipation of the said solenoid valves and thus the temperature within the container H.

For the control of the temperature in the casing H of an electropneumatic assembly G moreover it is possible to have one or more heating elements, for example resistors, such as that indicated HR in FIG. 15, the electrical supply of which is controlled by the unit ECU as a function of the temperature detected in the casing or container H by the sensor TS. Such heating resistors can in particular be incorporated into the supporting circuit boards of the devices and components of the unit ECU.

Figure 16:
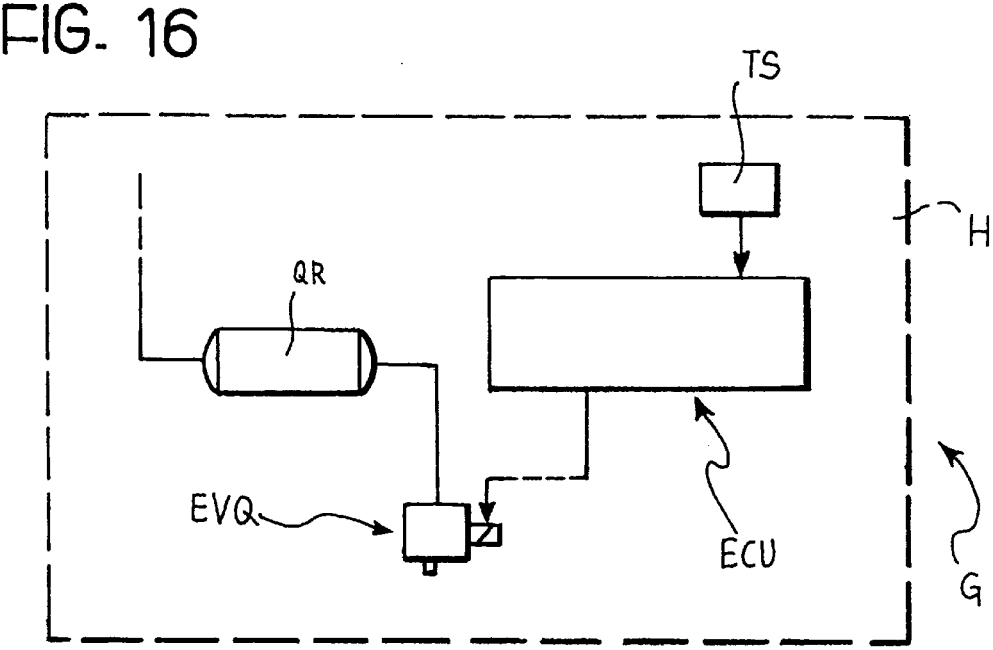

Another system (additional or alternative to those already described) for control of the temperature in the container or casing H of an electropneumatic control assembly G is that which will now be described with reference to FIG. 16. The arrangement illustrated in this figure envisages a compressed air reservoir QR with which there is associated a discharge solenoid valve EVQ controlled by the unit ECU. The solenoid valve EVQ, when excited, is able to cause compressed air to be drawn from the reservoir QR, the expansion of which is able to cause a cooling effect of the internal region of the casing or container H.

Naturally, the principle of the invention remaining the same, the embodiments and details of construction can be widely varied with respect to what has been described and illustrated purely by way of non-limitative example, without by this departing from the ambit of the invention as defined in the attached claims.

What is claimed is:

1. A braking system for a railway or tram vehicle having at least two axles, comprises at least one main pneumatic duct, pneumatic actuator device for a service brake and a supplementary brake, at least one auxiliary reservoir connected to the said main duct and operable to provide compressed air for braking to the said actuators; and at least one compact electropneumatic control assembly having an input connector connected to the said main pneumatic duct by means of a single connection duct, an inlet/outlet connector connected to the auxiliary reservoir and further connected within the assembly to the said inlet connector to allow air under pressure coming from the main duct to be supplied to the said auxiliary reservoir;

a plurality of further inlet/outlet connectors connected to service and supplementary brake actuators;

at least one pneumatic circuit for control of the service brake and the supplementary brake, connected between the said auxiliary reservoir and the said further inlet/outlet connectors; the said pneumatic circuit comprising a plurality of solenoid control valves, and sensors/transducers operable to provide electrical signals indicative of quantities or conditions monitored in the said pneumatic circuit; and an electronic communication and control unit connected to at least one communications line, to the said sensors/transducers, and to the said solenoid valves;

the said electronic unit being arranged to control the said solenoid control valves in a predetermined manner to actuate the service brake or the supplementary brake on the basis of information or control signals arriving at it via the communication line and in dependence on signals provided by the said sensors and transducers; and the said pneumatic control circuit is operable, in the case of simultaneous activation of the service brake and the supplementary brake, to cause passage to the brake actuators of a pressure equal to the higher of the pressure values available for service braking and supplementary braking respectively.

2. A braking system according to claim 1, including at least one first and one second electropneumatic control assembly each of which is associated with a respective bogie of the vehicle.

3. A braking system according to claim 2, wherein the said electropneumatic control assemblies are each installed on corresponding bogies of the vehicle.

4. A braking system according to claim 1, comprising a single electropneumatic control assembly connected to the brake actuators of various bogies of the vehicle.

5. A braking system according to claim 1, wherein the electronic unit of the said at least one electropneumatic control assembly is connected to the said at least one communications line by means of an interface device of gateway type.

6. A braking system according to claim 1, wherein the said at least one electropneumatic control assembly comprises memory means operable to store information indicative of the weight of the vehicle; the said electropneumatic control assembly being arranged to apply, during supplementary braking, a brake pressure the value of which is a function of the weight value stored in the said memory means.

7. A braking system according to claim 6, wherein the said electronic unit is arranged to cause, via solenoid valve means the storing of a pressure corresponding to the weight of the vehicle in a pneumatic memory reservoir; the said memory reservoir being associated with an electric transducer operable to provide the electronic unit with signals indicative of the pressure stored in the said memory reservoir.

8. A braking system according to claim 6, wherein the said memory means comprise a stepping electric motor controlled by the electronic unit as a function of a weight signal of the vehicle provided by a transducer, in such a way as to vary the load of the spring associated with a pressure regulating valve.

9. A braking system according to claim 1, wherein the said electronic control unit is arranged to control the said solenoid control valves to operate in a predetermined anti-slip manner by alternate excitation and de-excitation of the said solenoid valves both during the course of service braking and during the course of supplementary braking.

10. A braking system according to claim 9, wherein the said pneumatic control circuit is configured in such a way that during actuation of the anti-slip function in the course of a service braking the brake pressures applied to each axle are controlled individually, and in the actuation of anti-slip function during supplementary braking all the brake actuators of a single bogie have the same controlled brake pressure applied to them.

11. A braking system according to claim 1 further provided with a general braking pneumatic duct and a brake control distributor connected to the said general duct; wherein the said at least one electropneumatic control assembly is provided with a further inlet connector connectable to the outlet of the said distributor and connected, within the assembly, to the said pneumatic control circuit which is arranged to actuate braking when the said distributor transmits to it a control pressure according to predetermined priorities.

12. A braking system according to claim 1 for a vehicle provided with pneumatic standing or parking brake actuators, wherein the said at least one electropneumatic assembly comprises a pneumatic circuit for controlling the pressure in the said standing or parking brake actuators, the said circuit comprising control valve means controlled by the said electronic unit.

13. A braking system according to claim 12, wherein the said control valve means comprise a solenoid valve of bistable type.

14. A braking system according to claim 12, wherein the said control valve means comprise a pair of pneumatic valves and associated solenoid control valves, interconnected together in the same arrangement as that adopted for the control of the supplementary brake.

15. A braking system according to claim 12, wherein the pneumatic circuit for control of the standing or parking brake is coupled to the pneumatic circuit for control of the service or supplementary brake by means of valve means operable to allow a fraction of the service brake power to be supplied to the actuators of the standing or parking brake.

16. A braking system according to claim 1 for a vehicle provided with pneumatic emergency brake actuators, wherein said at least one electropneumatic assembly comprises a pneumatic circuit including solenoid control valves controlled by the said electronic unit to allow supply of a control pressure to the said emergency brake actuators.

17. A braking system according to claim 1 for a vehicle provided with cleaning shoes which can be actuated by means of pneumatic cylinders, wherein said at least one electropneumatic control assembly includes a pneumatic circuit including solenoid control valves controlled by the said electronic unit to allow supply of a self-governing command pressure to the pneumatic cylinders associated with the said cleaning shoes.

18. A braking system according to claim 1, wherein the said electronic unit is arranged to control the said solenoid control valves by; means of respective electronic switches controlled by average value square wave signals, and in particular having a duty cycle which is variable in such a way as to control the heat dissipation in the said solenoid valves.

19. A braking system according to claim 18, wherein the said at least one electropneumatic assembly is enclosed in a support container in which there is disposed a temperature sensor connected to the said electronic unit which is arranged to control the said solenoid control valves with signals having a variable average value in such a way that the heat dissipation in the solenoid valves is controlled as a function of the temperature indicated by the said sensor.

20. A braking system according to claim 1, wherein the said at least one electropneumatic assembly comprises at least one circuit board in which there is incorporated at least one heating element the electrical supply to which is controlled in dependence on the temperature detected in the casing or support container of the said electropneumatic assembly by means of a sensor connected to the said electronic unit.

21. A braking system according to claim 1, wherein the said at least one electropneumatic assembly is enclosed in a container or support casing in which there is disposed a temperature sensor connected to the said electronic unit; the said assembly including a compressed air reservoir with which there is associated a discharge Solenoid valve controlled by the electronic unit in such a way that when the temperature in the said container exceeds a predetermined value, a quantity of air is discharged from the said reservoir via this solenoid valve the expansion of which is able to cause a cooling effect.

22. A braking system according to claim 1, including a line which extends along the vehicle and is connected to the electronic unit of the or each electropneumatic assembly, and in which there is an enablement device operable to connect the said line to a brake control apparatus to allow the continuation of the service by means of breakdown signals emitted by the said apparatus in the case of breakdown for example of the said communication line.

23. A braking system according to claim 1, wherein the pressure transducers associated with the said at least one pneumatic control circuit are mounted directly on one or more circuit cards or boards of the associated electronic control unit and are coupled to the said at least one pneumatic circuit by pneumatic ducts.

24. A braking system according to claim 1, wherein the said at least one pneumatic control circuit comprises a plurality of identical pneumatic valves which are associated with respective solenoid control valves controlled by the said electronic communication and control unit.

25. A braking system according to claim 24, wherein each of the said pneumatic valves comprise a body in which there is a membrane shutter which controls communication between an inlet and an outlet of the valve, and which defines, with respect to the body, a pilot chamber to which the associated solenoid control valve is connected.

26. A braking system according to claim 25, wherein the said pilot chamber of a supplementary brake control pneumatic valve is associated with a pressure-sensitive switch connected to a control unit to indicate if the discharge path of the said pilot chamber is open or closed.

27. A braking system according to claim 1 for a vehicle further provided with a general pneumatic duct, wherein the said general duct is associated with a pressure transducer and a pressure-sensitive switch connected to the electronic communication and control unit of the or each electropneumatic assembly the said unit being arranged to control the service brake and the supplementary brake of the vehicle as a function of the value of the pressure in the said general duct.

28. A braking system for a railway or tram vehicle having at least two axles, comprises at least one main pneumatic duct, pneumatic actuator device for a service brake and a supplementary brake, at least one auxiliary reservoir connected to the said main duct and operable to provide compressed air for braking to the said actuators; and at least one compact electropneumatic control assembly having an input connector connected to the said main pneumatic duct by means of a single connection duct, an inlet/outlet connector connected to the auxiliary reservoir and further connected within the assembly to the said inlet connector to allow air under pressure coming from the main duct to be supplied to the said auxiliary reservoir;

a plurality of further inlet/outlet connectors connected to service and supplementary brake actuators;

at least one pneumatic circuit for control of the service brake and the supplementary brake, connected between the said auxiliary reservoir and the said further inlet/outlet connectors; the said pneumatic circuit comprising a plurality of solenoid control valves, and sensors/transducers operable to provide electrical signals indicative of quantities or conditions monitored in the said pneumatic circuit; and an electronic communication and control unit connected to at least one communications line, to the said sensors/transducers, and to the said solenoid valves;

the said electronic unit being arranged to control the said solenoid control valves in a predetermined manner to actuate the service brake or the supplementary brake on the basis of information or control signals arriving at it via the communication line and in dependence on signals provided by the said sensors and transducers; and wherein along the vehicle extend first and second conductors which are respectively connected to first and second return conductors in such a way as to provide first and second safety loops maintained at respective different electrical potentials; the solenoid control valves of the said at least one electropneumatic assembly including solenoid valves for controlling supplementary braking which are selectively controllable by the electronic unit and by supervision means for supervising the potential difference between the return conductors of the said safety loops in such a way that when the said potential difference falls the supplementary braking is automatically actuated.

29. A braking system according to claim 28, wherein the said supervision means comprise a rectified circuit connected between the return conductor of the said safety loops, a current generator connected to the output of the rectifier circuit to supply a predetermined current to a photodiode coupled to a phototransistor operable to cause commutation of the associated solenoid valve.

30. A braking system according to claim 29, wherein the excitation winding of each supplementary brake control solenoid valve has a terminal connected to voltage supply means comprising two supply circuits the outputs of which are connected together in an OR configuration.

* * * * *